United States Patent [19]
Tale' et al.

[11] Patent Number: 6,089,820
[45] Date of Patent: Jul. 18, 2000

[54] UNIT FOR FORMING AND SUPPLYING STACKS OF PRODUCTS TO A MACHINE

[75] Inventors: Fabrizio Tale'; Mario Spatafora, both of Bologna, Italy

[73] Assignee: Azionaria Costruzioni Macchine Automatiche A.C.M.A. S.p.A., Bologna, Italy

[21] Appl. No.: 09/160,626

[22] Filed: Sep. 24, 1998

[30] Foreign Application Priority Data

Sep. 25, 1997 [IT] Italy ................................ B097A0578

[51] Int. Cl.[7] .................................................. B65G 57/30
[52] U.S. Cl. .................. 414/795.1; 414/795; 414/795.3; 198/467.1; 198/626.1
[58] Field of Search .............................. 414/794.9, 795, 414/795.1, 795.3; 198/467.1, 626.1

[56] References Cited

U.S. PATENT DOCUMENTS

| | | | |
|---|---|---|---|
| 3,866,763 | 2/1975 | Alduk .................................... | 414/795.3 |
| 3,938,675 | 12/1976 | Rees . | |
| 4,030,528 | 6/1977 | Horning ................................ | 414/795.3 |
| 4,314,785 | 2/1982 | LaFleur, Jr. et al. ................ | 414/795.1 |
| 4,957,409 | 9/1990 | Fukao et al. ......................... | 414/795.1 |
| 5,088,883 | 2/1992 | Focke et al. ......................... | 414/795.3 |
| 5,236,300 | 8/1993 | Aida et al. ........................... | 414/795.1 |
| 5,727,925 | 3/1998 | Ozawa et al. ........................ | 414/795.3 |
| 5,823,738 | 10/1998 | Spatafora et al. .................... | 414/795.1 |

FOREIGN PATENT DOCUMENTS

| | | |
|---|---|---|
| 0 403 956 | 12/1990 | European Pat. Off. . |
| 0 784 028 | 7/1997 | European Pat. Off. . |
| 0 806 388 | 11/1997 | European Pat. Off. . |
| 774928 | 5/1957 | United Kingdom ................ 414/795.3 |

*Primary Examiner*—Douglas Hess
*Attorney, Agent, or Firm*—Christensen O'Connor Johnson Kindness PLLC

[57] ABSTRACT

A unit for forming and supplying stacks of products to a machine, wherein a stacking device lifts the products successively off a continuous supply conveyor to form stacks which are fed along a supporting surface by a pocket conveyor for supplying the machine; and wherein, to enable at least partial formation of a stack before a respective conveying pocket is arrested in such a position as to receive the stack, the stacking device is provided with a stop member, which is movable to and from a position of interference with the pockets of the pocket conveyor, and against which the stack is at least partly formed.

10 Claims, 2 Drawing Sheets

UNIT FOR FORMING AND SUPPLYING STACKS OF PRODUCTS TO A MACHINE

BACKGROUND OF THE INVENTION

The present invention relates to a unit for forming and supplying stacks of products to a machine.

In particular, the present invention relates to a unit of the above type for supplying stacks of products to a "form, fill and seal" packing machine.

The present invention may be used to advantage in the food conditioning industry, to which the following description refers purely by way of example.

In the food conditioning industry, stacks of products are formed, each comprising at least two superimposed products contacting each other, and each stack is fed to a "form, fill and seal" machine, for producing multiple packages of products, each defined by a given number of side by side stacks and enclosed in a single overwrapping.

Some known units for forming and supplying stacks of products comprise a continuous input conveyor for feeding a succession of products in a supply direction and on a bottom conveying surface to the input of a stacking device, which transfers the products continuously to its own output at a top surface so as to form, on the top surface, a succession of stacks of products; and an unloading device moving back and forth in an unloading direction through the output of the stacking device to successively remove and feed the stacks of products along the top surface to a machine.

Known units of the above type have proved unsuitable for use on production lines comprising high-speed packing and conditioning machines, on account of the downtime caused by the back and forth movement of the unloading device through the output of the stacking device, and which is unacceptable on modern production lines.

To overcome the above drawback, the unloading device has been replaced by a pocket conveyor traveling in steps in the unloading direction through the output of the stacking device. More specifically, each pocket on the conveyor is designed to contain a respective stack of products; is arrested at the output of the stacking device before the products eventually forming the stack associated with the pocket are fed to the output; and, after receiving the respective stack of products from the stacking device, is fed in steps in the unloading direction to feed the stack to the machine.

While indeed succeeding in reducing, in fact substantially halving, the downtime involved previously, the above pocket conveyor still involves a certain amount of downtime due to stacking of the products having to be suspended as the conveyor is moved forward and until the next empty pocket is arrested at the output of the stacking device.

SUMMARY OF THE INVENTION

It is an object of the present invention to provide a unit for forming and supplying stacks of products to a machine, designed to overcome the aforementioned drawback.

More specifically, it is an object of the present invention to provide a unit for forming and supplying stacks of products to a machine, designed to eliminate said downtime substantially completely.

According to the present invention, there is provided a unit for forming and supplying stacks of products to a machine, each said stack comprising a bottom product and at least one upper product, and the unit comprising a stacking device for forming a succession of said stacks and having an input for said products and an output for said stacks, said input and said output being respectively located at a first and a second surface, the second extending at a higher level than the first; conveying means for feeding a succession of said products along said first surface and in a first direction to said input; and a pocket conveyor comprising a number of pockets moving in steps in a given second direction through said output, so as to receive a respective said stack inside each pocket and feed the stack along said second surface to said machine; the unit being characterized in that said stacking device comprises a stop device located at said output and comprising a first stop member movable back and forth between a lowered position and a raised position in which said first stop member is respectively located below and above said second surface; each said pocket being defined, at least when the pocket is located at said output, by a first and a second wall for retaining said stack, the second wall being located in front of the first wall in said second direction; and said second wall being defined, at least as regards a portion facing said second surface, by said first stop member in the raised position.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
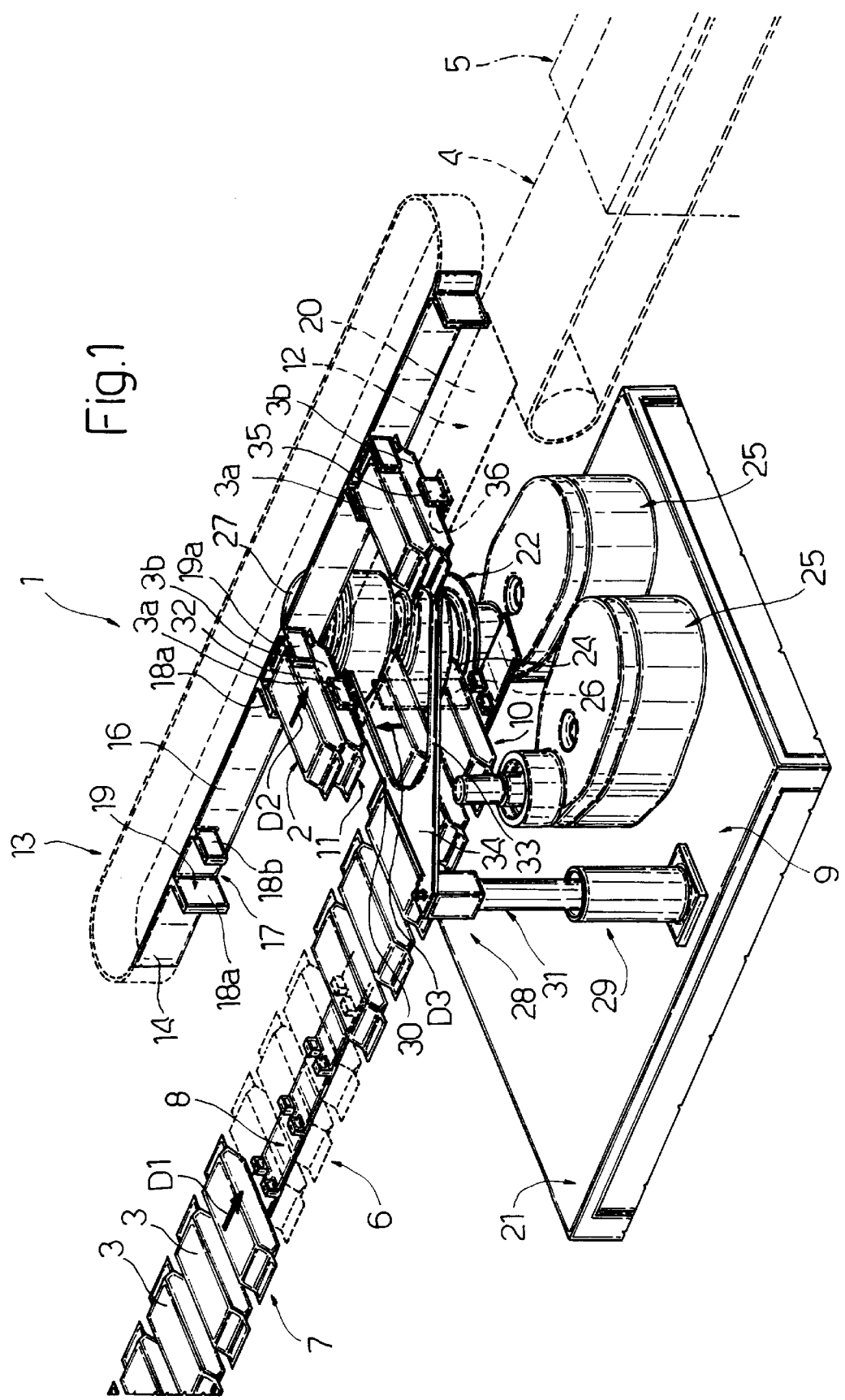
FIG. 1 shows a schematic view in perspective, with parts removed for clarity, of a preferred embodiment of the unit according to the present invention.

Number 1 in the accompanying drawings indicates as a whole a unit for forming and supplying stacks 2 of products 3 to an input device 4 of a machine 5, in particular a "form, fill and seal" packing machine for producing multiple packages (not shown), each comprising a given number of stacks 2 enclosed in a single overwrapping. More specifically, unit 1 provides for forming stacks 2, each comprising at least two products 3 laid flat one on top of the other.

Unit 1 comprises a known pocket conveyor 6 for continuously feeding a succession 7 of products 3 on a horizontal conveying surface 8 and in a direction D1 parallel to surface 8; and a stacking device 9, which has an input 10 on a level with surface 8 to receive the products 3 in succession 7, and provides for transferring products 3 continuously from conveyor 6 to a respective output 11 at a surface 12 parallel to and higher than surface 8, so as to form a succession of stacks 2 on surface 12. Unit 1 also comprises an unloading conveyor 13 moving in steps through output 11 in a direction D2 parallel to surface 12, to successively remove stacks 2 from output 11 and feed stacks 2 along surface 12 to input device 4 of machine 5.

Figure 2:
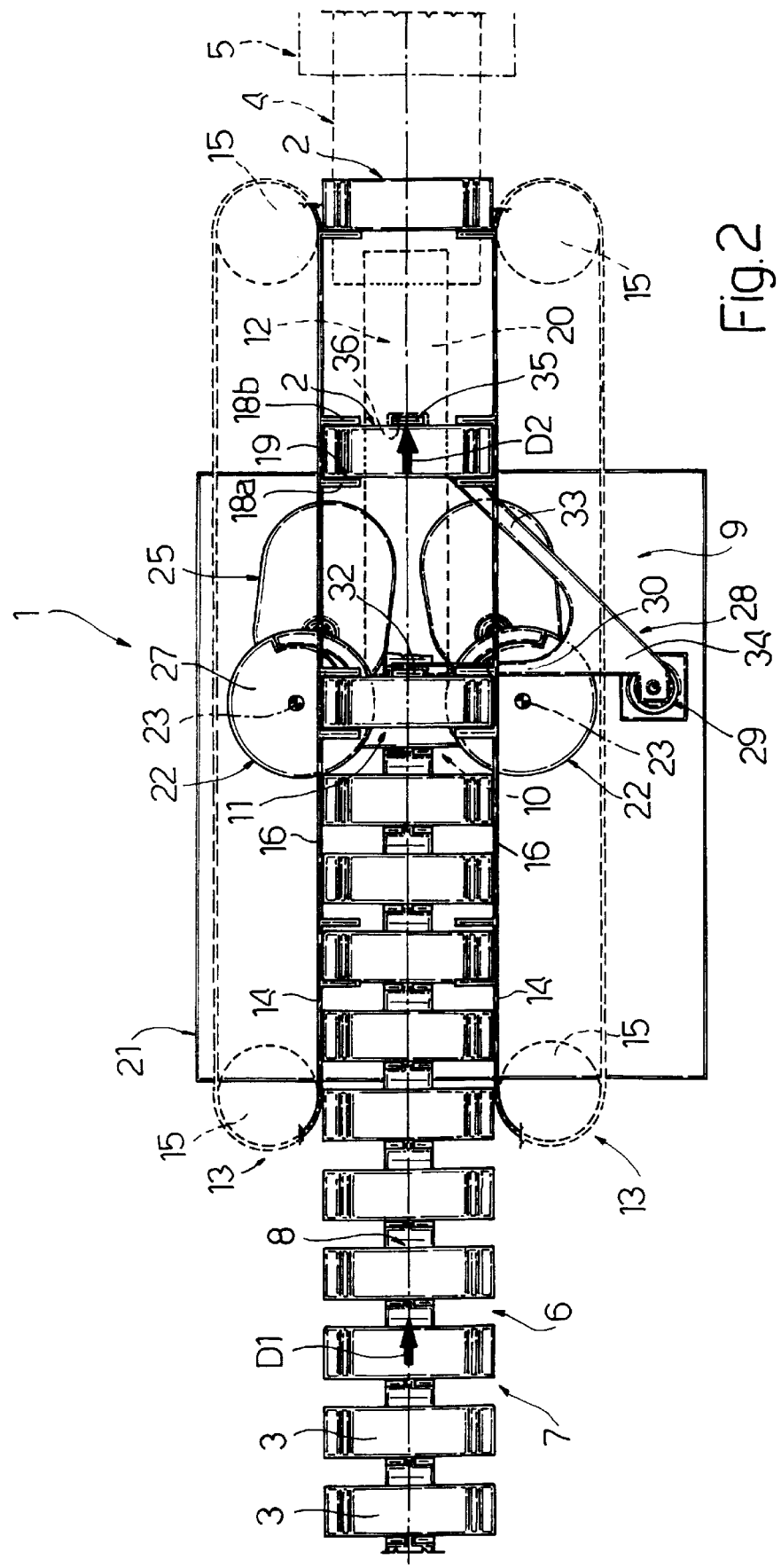
FIG. 2 shows a plan view, with parts removed for clarity, of the FIG. 1 unit.

Unloading conveyor 13 comprises two belts 14, each looped about a respective pair of vertical-axis pulleys 15 (shown by dash lines in FIG. 2), and each comprising a conveying branch 16 extending through output 11 in direction D2 and lying in a plane perpendicular to surface 12. The two branches 16 of belts 14 are parallel to each other, are positioned facing each other on opposite sides of output 11, and are separated by a distance—measured crosswise to the planes of branches 16—approximately equal to but no smaller than the length of products 3 measured crosswise to direction D1 and parallel to surface 8.

Each belt 14 is of a height—measured in a direction D3 perpendicular to surface 12, and as of surface 12 with which respective conveying branch 16 is substantially tangent—substantially equal to the height of each stack 2, so that each stack 2 on surface 12 is retained heightwise between the two branches 16. Externally, each belt 14 comprises a succession of equally spaced pairs 17 of walls 18a, 18b, wall 18a being located behind wall 18b in direction D2; and each pair 17 of one of belts 14 defines, with the corresponding pair 17 of the other belt 14, a pocket 19 for housing a stack 2 of products 3. Wall 18b is shorter, in direction D3, than the corresponding wall 18a, and is positioned facing an upper portion of wall 18a.

Surface 12 is defined by a fixed plate 20 located between branches 16 of belts 14, and extending in direction D2 from output 11 of stacking device 9 to input device 4 of machine 5.

Each pocket 19 is fed in steps in direction D2, and is arrested at output 11 to receive a respective stack 2 of products 3. More specifically, walls 18a of each pocket 19 extend the full height of respective belts 14, so as to contact all the products 3 in respective stack 2 and feed stack 2 to machine 5; whereas each wall 18b covers only a top portion of the height of respective belt 14, so that, when positioned over plate 20, wall 18b defines with plate 20 a passage of a height approximately equal to but no smaller than the thickness—measured in direction D3—of at least one product 3.

Stacking device 9 is supported on a fixed base 21 located beneath surface 8, and comprises two known counter-rotating screws 22, which extend between surface 8 and surface 12 as of input 10, are located on opposite sides of conveyor 6 at input 10, and rotate about respective substantially vertical axes 23 extending parallel to each other and to direction D3. Each screw 22 engages a respective end portion 24 of each product 3 to lift product 3 off surface 8 and feed the product to output 11 over surface 12. Screws 22 are fitted to base 21 by means of a supporting and adjusting device 25 for adjusting in known manner the distance between axes 23 of screws 22 and so enabling products 3 of different sizes to be stacked.

Stacking device 9 also comprises a vertical stop plate 26 located between screws 22 and extending in direction D3, crosswise to surfaces 8 and 12, and between input 10 and output 11. Plate 26 has a top edge substantially coplanar with the top face of plate 20, with surface 12, and with respective substantially flat top surfaces 27 of screws 22, and provides for arresting the movement of products 3 in direction D1, and for guiding products 3 towards output 11; for which purpose, the two screws 22 are so rotated as to push products 3 against plate 26.

Stacking device 9 also comprises a stop device 28 by which to form stacks 2 at output 11.

In the example shown, stop device 28 comprises a linear actuator 29 extending upwards from base 21; a rod 30 connected integrally to the top end of an output member 31 of actuator 29; and a flat appendix 32, which is perpendicular to surfaces 8 and 12 and to direction D2, extends upwards from the free end of rod 30, and is substantially coplanar with plate 26. A further rod 33, inclined with respect to rod 30, extends from the end of rod 30 adjacent to member 31, and defines with rod 30 a V-shaped body 34 lying in a plane parallel to surfaces 8 and 12. Rod 33, which is not strictly necessary and may even be dispensed with, is located to the front of rod 30 in direction D2, and, like rod 30, has a flat end appendix 35 parallel to appendix 32.

Appendixes 32 and 35 define respective stop members, are of a height—measured parallel to direction D3—substantially equal to the thickness of a product 3, and are separated by a distance—measured in direction D2—equal to the distance between adjacent pockets 19 on conveyor 13, i.e. equal to one forward step of conveyor 13.

By means of actuator 29, body 34 is movable vertically between a raised operating position (shown in FIG. 1)—in which appendix 32 is located at output 11, in front of the input end of plate 20 and above plate 20 and the top end of plate 26, and appendix 35 extends above plate 20 through an opening 36 formed in plate 20—and a lowered rest position—in which both appendixes 32 and 35 are located below plate 20. When a pocket 19 is arrested at output 11 and body 34 is set to the raised position, appendix 32 is coplanar with front walls 18b of pocket 19, and cooperates with the two walls 18b to define a front wall of pocket 19 of substantially the same height as the rear wall defined by the two walls 18a.

Operation of unit 1 will be described with reference to the formation of one stack 2 defined by two products 3, i.e. by a top and bottom product respectively indicated 3a and 3b.

Operation will also be described as of the condition in which conveyor 13 is stationary with a pocket 19 at output 11; two products 3 are located on surfaces 27 of screws 22, and occupy said pocket 19 to form a respective stack 2; body 34 is set to the raised position, so that appendix 32 is also in the raised position just beneath walls 18b to prevent product 3b from being pushed out from beneath product 3a by the frictional thrust in direction D2 imparted by screws 22 to product 3b resting directly on surfaces 27; and a further two products 3a and 3b are being fed along screws 22 in direction D3 and in contact with plate 26.

As of the above condition, body 34 and, consequently, appendix 32 are moved into the lowered rest position to release product 3b, and, at the same time, conveyor 13 begins moving one step in direction D2 to feed stack 2 in direction D2 along plate 20. Before the above step is completed, and as soon as stack 2 clears output 11, body 34 is restored to the raised position to enable appendix 32 to retain, in direction D2, the next product 3a positioned on surfaces 27 just over the top end of plate 26. The attainment of this position by the next product 3a coincides with the end of the forward step of conveyor 13, and with the arrival at output 11 of the next pocket 19, the walls 18b of which are arrested above the top of product 3a. As the next product 3b arrives at output 11, respective product 3a is inserted between walls 18a and 18b of respective pocket 19 to form another stack 2. At which point, the above stack 2 forming and supply cycle is repeated to form and transfer a succession of stacks 2, which are then supplied to input device 4 of machine 5.

Rod 33 and further stop appendix 35 are only used, though not necessarily, when, as in the example shown, stacks 2 are transferred to device 4 at the end of a second, as opposed to the first, step downstream from output 11, to prevent product 3b from slipping, due to inertia in direction D2, with respect to product 3a when conveyor 13 is arrested. If stacks 2 are moved more than two steps along plate 20, the number of stop appendixes carried by body 34 will obviously also be more than two, and in general will be equal to the number of steps performed.

In the example shown, the height of appendix 32 is therefore complementary to the height of wall 18b with respect to the height of wall 18a, and is equal to the height of wall 18b for the specific purpose of enabling product 3a of each stack 2 to be fed to output 11 in advance with respect to the arrival of respective pocket 19.

In general, therefore, and also taking into account stacks (not shown) comprising N number of products greater than two, it may be stated that:

the height of wall 18a is always equal to the height of the stack being formed; and the height of appendix 32 is equal to the height of the portion of the stack to be fed to output 11 in advance with respect to the arrival of respective pocket 19, and may range between a value less than the height of one product (minimum advance: a single product is fed to output 11 before belts 14 are arrested) and a value equal to the height of wall 18a (maximum advance: the whole stack is fed to output 11 before belts 14 are arrested).

In the latter case, wall 18b is dispensed with by being replaced entirely at output 11 by appendix 32. The same obviously also applies to appendix/es 35, the height of which is always equal to that of appendix 32.

What is claimed is:

1. A unit for forming and supplying stacks of products to a machine, each said stack comprising a bottom product and at least one upper product, and the unit comprising a stacking device for forming a succession of said stacks and having an input for said products and an output for said stacks, said input and said output being respectively located at a first and a second surface, the second surface extending at a higher level than the first surface; conveying means for feeding a succession of said products along said first surface and in a first direction to said input; and a pocket conveyor comprising a number of pockets moving in steps in a given second direction through said output, so as to receive a respective said stack inside each pocket and feed the stack along said second surface to said machine; wherein said stacking device comprises a stop device located at said output and comprising a first stop member movable back and forth between a lowered position and a raised position in which said first stop member is respectively located below and above said second surface; each said pocket being defined, at least when the pocket is located at said output, by a first and a second wall for retaining said stack, the second wall being located in front of the first wall in said second direction; and said second wall being defined, at least as regards a portion facing said second surface, by said first stop member in the raised position; said second wall comprising a top portion integral with said pocket conveyor, shorter than the corresponding first wall, and facing a top portion of the respective first wall; said first wall extending, downstream from said output in said second direction, substantially into contact with said second surface; and said top portion of said second wall defining, with said second surface, a passage for at least said upper product.

2. A unit as claimed in claim 1 wherein said top portion of each second wall is of a height, measured in a third direction crosswise to said second surface, substantially complementary to a height of said first stop member with respect to a height of said first wall.

3. A unit as claimed in claim 1 wherein the first and second surface are horizontal surfaces.

4. A unit as claimed in claim 1 wherein said stacking device comprises two screws, which extend between said first and second surfaces of said input, and rotate in opposite directions to successively feed the products to said output over said second surface; said screws feeding at least said bottom product of each said stack to said output in time with the positioning of the respective pocket at the output.

5. A unit for forming and supplying stacks of products to a machine, each said stack comprising a bottom product and at least one upper product, and the unit comprising a stacking device for forming a succession of said stacks and having an input for said products and an output for said stacks, said input and said output being respectively located at a first and a second surface, the second surface extending at a higher level than the first surface; conveying means for feeding a succession of said products along said first surface and in a first direction to said input; and a pocket conveyor comprising a number of pockets moving in steps in a given second direction through said output, so as to receive a respective said stack inside each pocket and feed the stack along said second surface to said machine; wherein said stacking device comprises a stop device located at said output and comprising a first stop member movable back and forth between a lowered position and a raised position in which said first stop member is respectively located below and above said second surface; each said pocket being defined, at least when the pocket is located at said output, by a first and a second wall for retaining said stack, the second wall being located in front of the first wall in said second direction; and said second wall being defined, at least as regards a portion facing said second surface, by said first stop member in the raised position; wherein said pocket conveyor comprises two pairs of pulleys, and two belts, each belt looped about a respective said pair of pulleys; said belts comprising respective conveying branches extending parallel to each other in the second direction and facing each other on opposite sides of said output; each said pocket being defined at the rear by a pair of said first walls, each of which is integral with a respective said belt.

6. A unit as claimed in claim 5 wherein each said conveying branch extends parallel to said second surface and lies in a plane perpendicular to the second surface.

7. A unit for forming and supplying stacks of products to a machine, each said stack comprising a bottom product and at least one upper product, and the unit comprising a stacking device for forming a succession of said stacks and having an input for said products and an output for said stacks, said input and said output being respectively located at a first and a second surface, the second surface extending at a higher level than the first surface; conveying means for feeding a succession of said products along said first surface and in a first direction to said input; and a pocket conveyor comprising a number of pockets moving in steps in a given second direction through said output, so as to receive a respective said stack inside each pocket and feed the stack along said second surface to said machine; wherein said stacking device comprises a stop device located at said output and comprising a first stop member movable back and forth between a lowered position and a raised position in which said first stop member is respectively located below and above said second surface; each said pocket being defined, at least when the pocket is located at said output, by a first and a second wall for retaining said stack, the second wall being located in front of the first wall in said second direction; and said second wall being defined, at least as regards a portion facing said second surface, by said first stop member in the raised position; wherein the stop device comprises a second stop member for each step traveled by said pocket conveyor between said output and said machine; said stop members being arranged in succession in said second direction and being equally spaced with a spacing equal to one step of said pocket conveyor; and each second stop member being movable with said first stop member between said lowered and raised positions.

8. A unit as claimed in claim 7 wherein said second wall comprises a top portion integral with said pocket conveyor, shorter than the corresponding first wall, and facing a top portion of the corresponding first wall; each second stop member being of a height, measured crosswise to said second surface, substantially complementary to the height of said top portion of said second wall with respect to the height of said first wall.

9. A unit as claimed in claim 7 wherein said second surface comprises, for each said second stop member, a respective opening, which is engaged by the respective said second stop member when the second stop member is in the raised position.

10. A unit as claimed in claim 7 wherein said first stop member is integral with each said second stop member.

* * * * *